(12) United States Patent
Kurosawa (10) Patent No.: US 6,343,854 B1
(45) Date of Patent: Feb. 5, 2002

(54) ELECTROSTATIC ACTUATOR AND AN APPARATUS MOUNTED WITH THE SAME

(75) Inventor: Ryuichi Kurosawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/319,641

(22) PCT Filed: Oct. 13, 1998

(86) PCT No.: PCT/JP98/04608

§ 371 Date: Jun. 8, 1999

§ 102(e) Date: Jun. 8, 1999

(87) PCT Pub. No.: WO99/19978

PCT Pub. Date: Apr. 22, 1999

(30) Foreign Application Priority Data

Oct. 14, 1997 (JP) .............................................. 9-280675

(51) Int. Cl.⁷ .................................................. B41J 2/06
(52) U.S. Cl. ....................................................... 347/55
(58) Field of Search .......................... 347/55, 151, 120, 347/141, 154, 103, 123, 111, 159, 127, 128, 131, 158, 271; 399/290, 292, 293, 294, 295

(56) References Cited

U.S. PATENT DOCUMENTS 5,988,799 A * 11/1999 Abe et al. ...................... 347/54

FOREIGN PATENT DOCUMENTS

| JP | 6395867 | 4/1988 |
| JP | 229017 | 1/1990 |
| JP | 4261374 | 9/1992 |
| JP | 4325883 | 11/1992 |
| JP | 5328749 | 12/1993 |
| JP | 99649 | 1/1997 |
| JP | 920007 | 1/1997 |

OTHER PUBLICATIONS

Patent Abstract of Japan of 09020007 Dated Jan. 21, 1997.
Minami, K., et al. "Damping Control for Packaged Micro Mechanical Devices", T. IEE, vol. 117–E, No. 2, (1997), pp. 110–116.
Patent Abstracts of Japan of JP 09009649 of Jan. 1997.
Patent Abstracts of Japan JP 04261374 of Sep. 1992.
Patent Abstracts of Japan JP 04325883 of Nov. 1992.
Patent Abstracts of Japan of JP 63095867 of Apr. 1988.
Patent Abstracts of Japan 05328749 of Dec. 1993.

* cited by examiner

Primary Examiner—Raquel Yvette Gordon
(74) Attorney, Agent, or Firm—Ladas & Parry (57) ABSTRACT

An electrostatic actuator and an apparatus having such an actuator mounted therein, in which gas generated in a groove is absorbed by a getter material so that an electrostatic force is stabilized, and which are less in time aging. In the case of an ink jet head, as an electrostatic actuator, which comprises a plurality of independent discharge chambers (6) respectively communicating with nozzles (4), diaphragms (5) formed in the bottom portions of the discharge chambers (6) respectively so as to be mechanically transformed, electrodes (9) provided in recess portions (20) provided in parallel with the diaphragms (5) and for driving the diaphragms (5) respectively, and a common ink cavity (8) for feeding ink to the plurality of discharge chambers (6), further recess portions (22) are formed in substrate (3) so as to communicate with the recess portions (20) provided in the substrates (3) respectively, and a getter material (30) is disposed in each of the recess portion (22).

16 Claims, 11 Drawing Sheets

ELECTROSTATIC ACTUATOR AND AN APPARATUS MOUNTED WITH THE SAME

TECHNICAL FIELD

The present invention relates to an electrostatic actuator used for an ink jet head, a reflector type diffraction grating, a reflector type light valve, and so on, and an apparatus having such an electrostatic actuator mounted therein, and particularly relates to stabilization of driving such an electrostatic actuator.

BACKGROUND OF THE INVENTION

In that which uses an electrostatic actuator, for example, in an ink jet head, precision fine machining and high accurate bonding technique are required for manufacturing the ink jet head in accordance with a demand for high definition character printing. Various kinds of manufacturing methods have been developed therefore. Of them, an ink jet head disclosed in JP-A-9-20007 has realized very high accurate bonding in a manner such that a silicon wafer having an ink cavity formed therein, and borosilicate glass having an actuator are bonded with each other by anodic bonding.

However, in the above-mentioned conventional technique, there was a problem that, after anodic bonding was completed, dielectric constant was changed by gas or the like generated inside a groove to which a driving means was attached so that electrostatic force was changed to make ink discharge unstable.

Such a problem also applied to an electrostatic actuator used for a reflector type diffraction grating, a reflector type light valve, and so on. Accordingly, there was another problem that, because of change in dielectric constant, the electrostatic force was not stabilized, and the operation of the actuator as an element was also unstable.

DISCLOSURE OF THE INVENTION

It is an object of the present invention to provide an electrostatic actuator and an apparatus mounted therewith, in which gas or the like generated inside a groove is absorbed by getter material so as to stabilize the electrostatic force with less time aging.

(1) In an electrostatic actuator according to the present invention comprising an insulating substrate provided with a recess portion, an electrode provided in the recess portion formed in the insulating substrate, and a thin film provided so as to cover the recess portion of the insulating substrate, wherein the thin film is transformed by electrostatic force generated by application of a voltage between the electrode and the thin film, a getter material is disposed in the recess portion or in another recess portion provided so as to communicate with the first-mentioned recess portion. Gas, moisture, and so on, in the recess portion are absorbed by this getter material. Accordingly, it is possible to prevent dielectric constant in the recess portion from changing, so that the electrostatic environment is stabilized, and the electrostatic force is therefore stabilized.

(2) In an electrostatic actuator according to the present invention as stated in the above item (1), the getter material consists of Ti or a Ti alloy. As for the Ti alloy, for example, an alloy of Ti and Zr, Ti and Al, or the like, is used.

(3) In an electrostatic actuator according to the present invention as stated in the above item (1) or (2), the getter material is heated so as to be activated after the insulating substrate and the thin film are bonded with each other in a manufacturing process.

(4) In an electrostatic actuator according to the present invention as stated in any one of the above items (1) to (3), a heating mechanism for heating the getter material is provided on the insulating substrate.

(5) In an electrostatic actuator according to the present invention as stated in the above item (4), the getter material is heated by supply of a heating current to the heating mechanism.

(6) In an electrostatic actuator according to the present invention as stated in the above item (4) or (5), a portion of the insulating substrate where the heating mechanism is provided is cut from a side opposite to a side where the heating mechanism is formed to thereby form a diaphragm.

(7) In an ink jet head according to the present invention, an electrostatic actuator stated in any one of the above items (1) to (6) is incorporated in the ink jet head as means for providing a driving force for discharging ink.

(8) In an ink jet head according to the present invention comprising a plurality of nozzle holes, a plurality of independent discharge chambers communicating with the nozzle holes respectively, a diaphragm formed in at least one wall of each of the discharge chambers so as to be able to be mechanically transformed, a groove provided in parallel with the diaphragm, a driving means provided in the groove for driving the diaphragm, and a common ink cavity for feeding ink to the plurality of discharge chambers, wherein when a pulse voltage is applied to the driving means, the diaphragm corresponding to the driving means is transformed in a direction so that pressure in the discharge chamber increases to discharge an ink drop toward recording paper from the nozzle hole, a getter material is disposed in the groove or in a recess portion communicating with the groove.

(9) In an ink jet apparatus according to the present invention, an ink jet head stated in the above item (7) or (8) is mounted in the ink jet recording apparatus.

(10) In a reflector type diffraction grating according to the present invention, an electrostatic actuator stated in any one of the above items (1) to (6) is incorporated into the diffraction grating as a driving means for light diffraction.

(11) In a reflector type diffraction grating according to the present invention comprising an insulating substrate having an area of a protrusion portion and an area of a recess portion, an electrode provided in the recess portion, and a thin film provided so as to cover the insulating substrate, wherein a voltage is applied between the electrode and the thin film to cause an electrostatic force to transform the thin film to be wavy by the electrostatic force generated, a getter material is disposed in the recess portion or another recess portion provided in communication with the first-mentioned recess portion.

(12) In an optical head according to the present invention, a reflector type diffraction grating stated in the above item (10) or (11) is mounted in the optical head.

(13) In a reflector type light valve according to the present invention, an electrostatic actuator stated in any one of the above items (1) to (6) is incorporated into the light valve as means for providing a driving force for the light valve.

(14) In a reflector type light valve according to the present invention comprising insulating substrates having recess portions respectively provided in two dimensions correspondingly to pixels, electrodes provided in the recess portions of the insulating substrates respectively, and thin films provided to cover the substrates respectively, wherein, when a voltage is applied between the electrode in one recess portion and corresponding one of the thin films to generate an electrostatic force, the thin film corresponding to the one recess portion is transformed by electrostatic force, getter material is disposed in each of the recess portions.

(15) In a projection type display unit according to the present invention, a reflector type light valve stated in the above item (13) or (14) is mounted in the unit.

THE BEST MODE FOR CARRYING-OUT THE INVENTION

Embodiment 1

Figure 1:
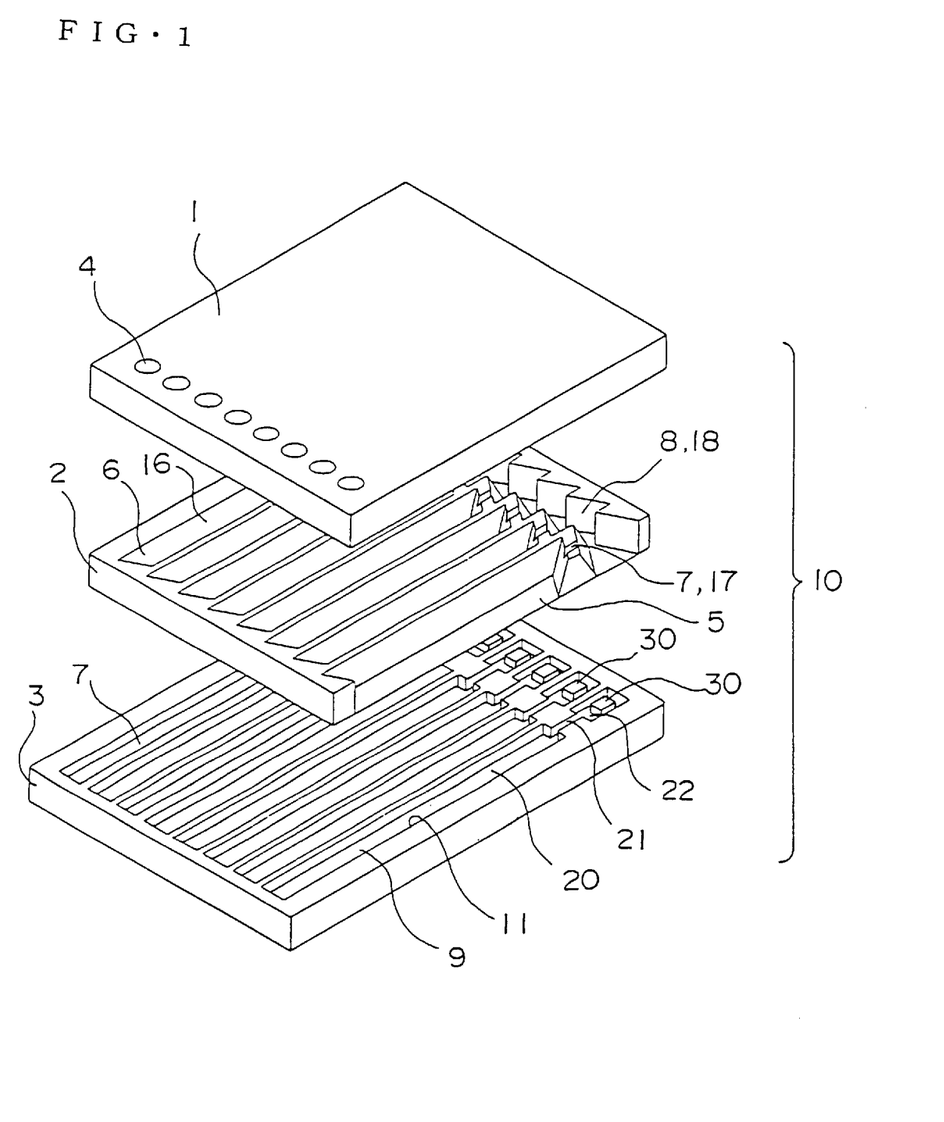
FIG. 1 is an exploded perspective view of an ink jet head according to Embodiment 1 of the present invention.
Figure 2:
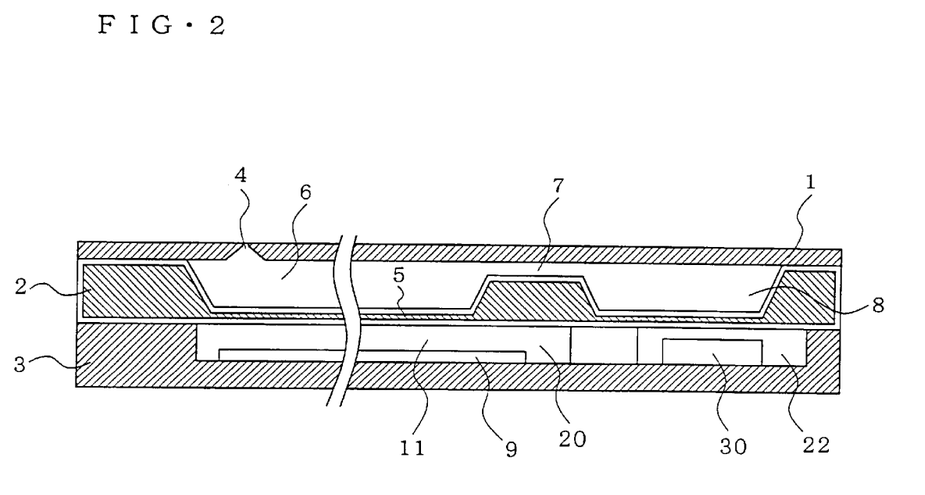
FIG. 2 is a sectional view of the ink jet head in FIG. 1.
Figure 3:
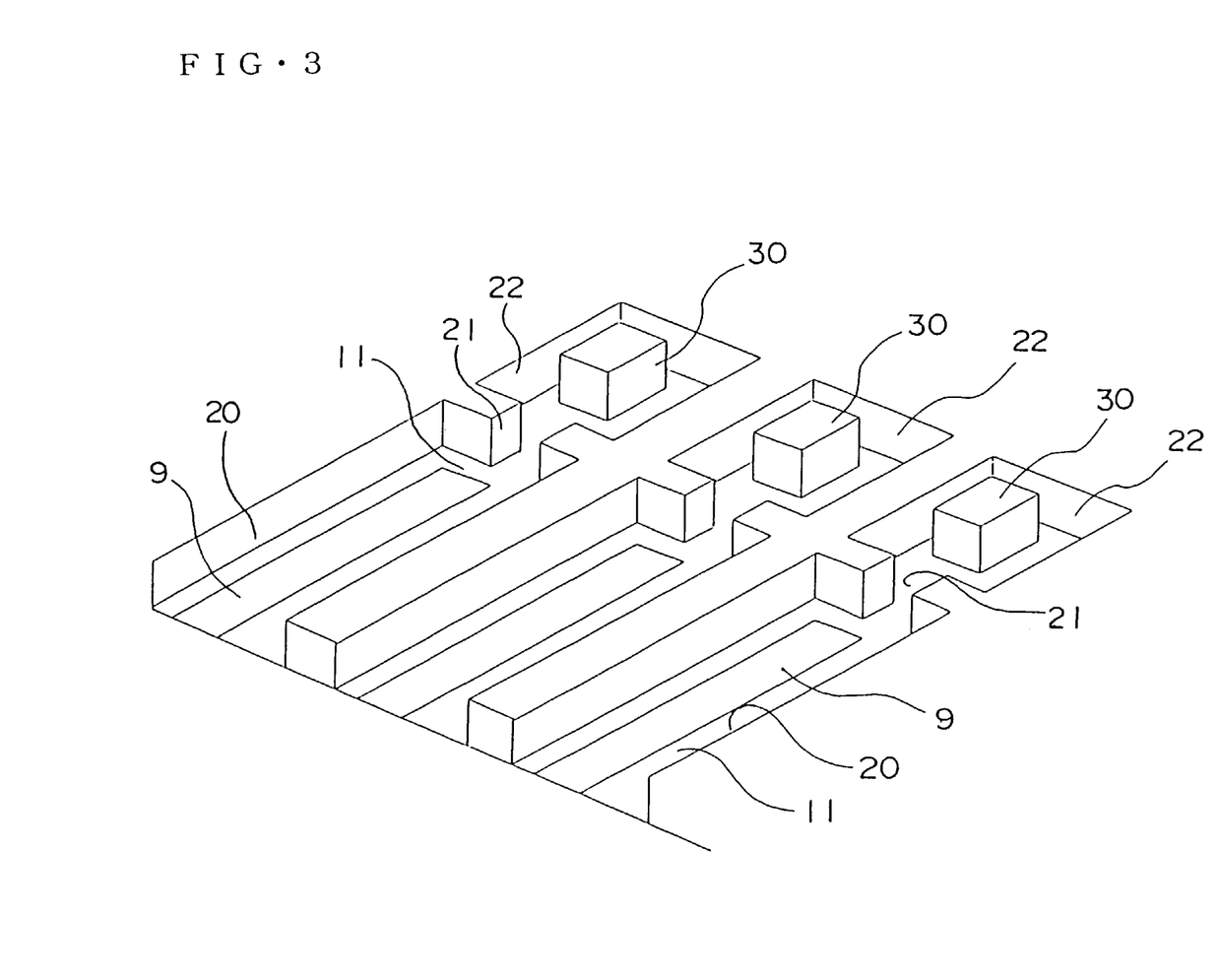
FIG. 3 is a perspective view illustrating the details of a third substrate of the ink jet head in FIG. 1.

An ink jet head 10 according to Embodiment 1 has a laminated structure where three substrates 1, 2 and 3 which will be described in detail later are put on top of one another, as shown in FIGS. 1 to 3. The first substrate 1 is formed of a single crystal silicon wafer of a face orientation (100), and provided with a plurality of nozzles 4 at equal intervals. The second substrate 2 is formed of a single crystal silicon wafer of a face orientation (110), and comprises recess portions 16, narrow grooves 17, and a recess portion 18. The recess portions 16 are provided correspondingly to the nozzles 4 to constitute ink discharge chambers 6 with their bottom wall acting as diaphragms 5. Narrow grooves 17 as ink inlets are provided at the rear of the recess portions 16 so as to constitute orifices 7. The recess portion 18 constitutes a common ink cavity 8 for feeding ink to the respective ink discharge chambers 6. In addition, the third substrate 3 is formed of an electrode glass substrate, for example, 500 $\mu$m thick, and comprises recess portions 20, and getter recess portions 23. The recess portions 20 have electrodes 9 on their bottom portions so as to constitute vibration chambers 11. The getter recess portions 22 communicate with the recess portions 20 through narrow grooves 21 and are provided with getter materials 30.

Next, a process of manufacturing the ink jet head shown in FIGS. 1 to 3 will be described with reference to the sectional views of FIGS. 4A to 4D. The explanation of bonding the first substrate 1 provided with the nozzles 4 and the second substrate 2 will be omitted in the description of this manufacturing process. In FIGS. 4A to 4D, the recess portion 18 is not illustrated.

Figure 4A:
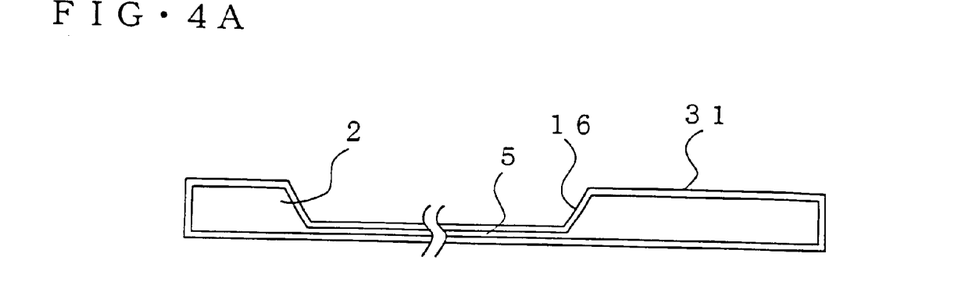
FIGS. 4A to 4D are explanatory diagrams showing a process of manufacturing the ink jet head of FIG. 1.

① First, the second substrate (silicon substrate) 2 provided with the diaphragm 5 is thermally oxidized in the oxygen atmosphere at 1,100° C. for a predetermined time to thereby form a thermally oxidized film 31 1,100Å thick on the surface (FIG. 4A).

Figure 4B:
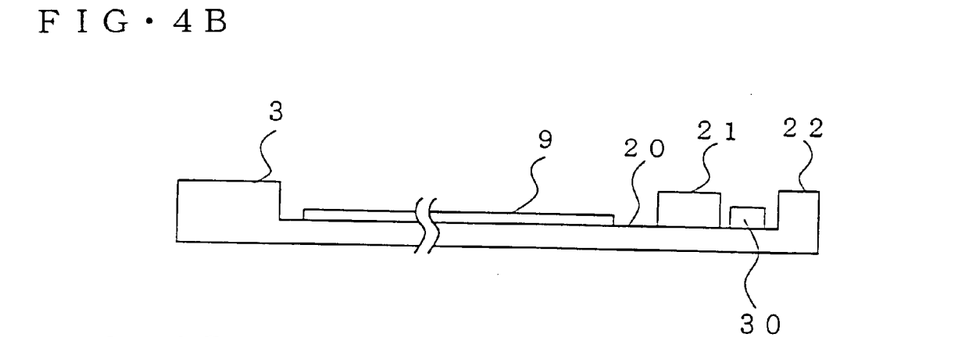

② Next, the electrodes 9 are formed in the respective recess portions 20 of the third substrate (electrode glass substrate) 3 (FIG. 4B). RF sputtering is used for formation of the electrodes 9, and dry etching is used for patterning. Although the electrodes 9 are formed of ITO in Embodiment 1, other materials, for example, metal materials such as Au, Pt, etc. may be used.

③ The getter materials 30 are put in the respective getter recess portions 22 of the third substrate 3 (FIG. 4B). Although Ti is used as the getter materials 30 in Embodiment 1, an ally of Ti and Zr or an alloy of Ti and Al may be used. Assume that the getter materials 30 used here are of the non-volatile type. The getter materials described here are used in other embodiments, which will be described later, in the same manner.

Figure 4C:
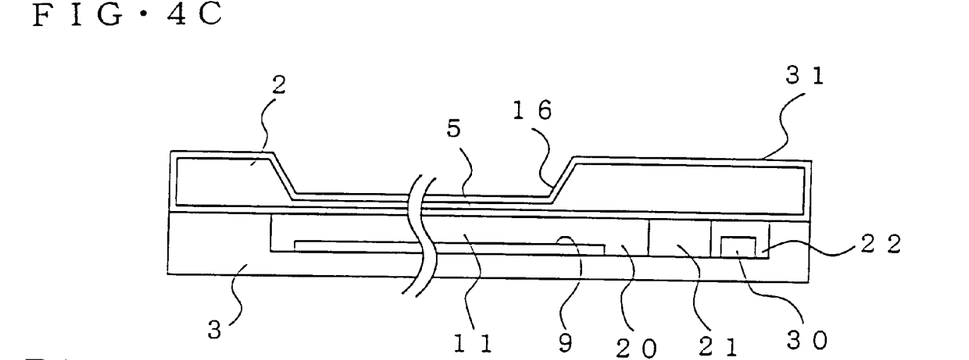

④ The second substrate (silicon substrate) 2 provided with the thermally oxidized film 31 and the third substrate (electrode glass substrate) 3 are positioned and put on top of each other (FIG. 4C).

⑤ The second substrate 2 and the third substrate 3 are thrown into an anodic bonding apparatus in a state where they are put on top of each other. This anodic bonding apparatus has been generally used in the conventional case, and it is constituted by a vacuum chamber, a vacuum pump, a heater for heating a substrate and a DC power supply to perform anodic bonding in a vacuum or in desired atmospheric gas.

Figure 4D:
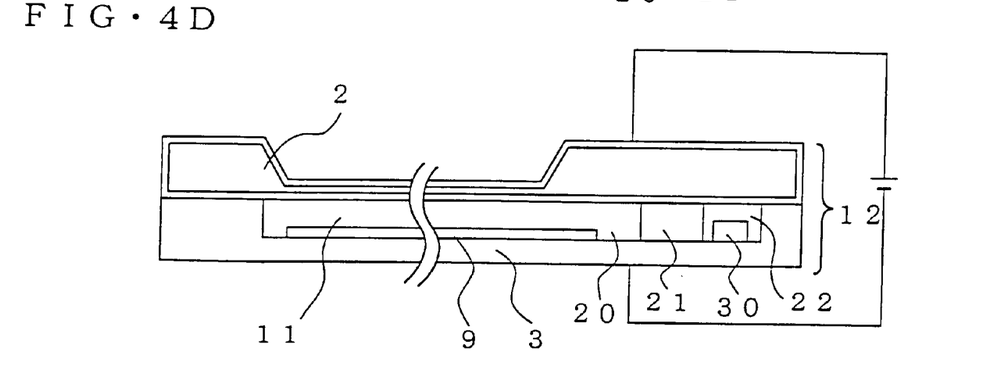

⑥ Next, the second substrate 2 and the third substrate 3 are heated up to 200° C. At this temperature, the chamber is evacuated to $10^{-6}$ Torr so as to evacuate the insides of the recess portions 20 and 22. After that, the chamber is pressurized to a predetermined pressure and heated to a predetermined temperature, and a DC voltage of 500 V is applied between the second substrate 2 as a positive side and the third substrate 3 as a negative side for 10 minutes to thereby perform anodic bonding to obtain a bonded substrate 12 (FIG. 4D). In Embodiment 1, the anodic bonding is performed under the conditions that the bonding temperature is 320° C., the pressure in the chamber is 2 atmospheres, and filler gas is argon, so that after the anodic bonding, the pressure inside the recess portions 20 and 22 is 1 atmosphere at room temperature. Although argon is used as filler gas in Embodiment 1, other rare gas such as helium, xenon or the like may be applicable.

Next, the bonded substrate 12 is heated up to 400° C. With temperature rising of this bonded substrate 12, the getter materials 30 are also heated and activated. Accordingly, the getter materials 30 absorb gas such as nitrogen, oxygen, etc. and moisture which are generated inside the recess portions 20 and 22 after the completion of the anodic bonding. After that, the bonded substrate 12 is air-cooled down to room temperature, and then extracted.

Next, the operation of the ink jet head manufactured thus will be described.

A pulse voltage is applied to the electrode 9 of the vibration chamber 11. When the surface of the electrode 9 is charged to a positive potential, the lower surface of the diaphragm 5 corresponding to the electrode 9 is charged to a negative potential. Therefore, the diaphragm 5 is bent downward by the attraction action by electrostatic force. When the voltage applied to the electrode 9 is turned OFF, the diaphragm 5 is restored. Therefore, the pressure in the discharge chamber 6 rises suddenly so as to discharge an ink drop toward recording paper from the nozzle hole 4. Next, the diaphragm 5 is bent downward again, so that ink is supplied into the discharge chamber 6 from the ink cavity 8 through the orifice 7, and the above-mentioned operation is repeated. While the ink jet head 10 operates in response to the attraction action of electrostatic force between the electrode 9 and the diaphragm 5 as mentioned above, gas and so on in the vibration chamber 11 are absorbed by the getter material 30. Accordingly, the electrostatic environment in the vibration chamber 11 is stable so that it is possible to obtain a stable attraction action of electrostatic force, and it is possible to obtain a stable ink discharge force.

Embodiment 2

Figure 5:
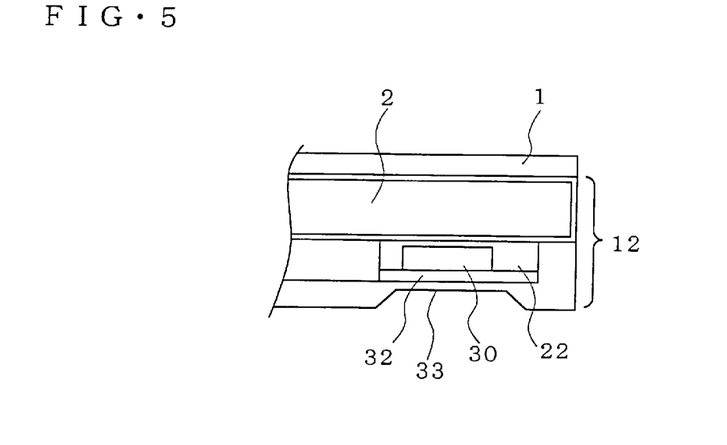
FIG. 5 is a sectional view of an ink jet head according to Embodiment 2 of the present invention.

Although an ink jet head according to Embodiment 2 has basically the same configuration as that in Embodiment 1, a getter material 30 and a getter heating heater 32 are provided in a getter recess portion 22 as shown in FIG. 5. This getter recess portion 22 also communicates with a recess portion 20 through a narrow groove 21. In addition, the bottom portion of the getter recess portion 22 opposite to the side where the getter heating heater 32 is provided is cut to be thin enough to form a diaphragm 33. Accordingly, it is taken into consideration that the thermal capacity is made small so as to improve the efficiency of heating the getter material 30.

Details about the process of manufacturing the ink jet head according to Embodiment 2 is omitted, because they are similar to that in Embodiment 1. A bonded substrate 12 is obtained after the completion of anodic bonding. Then, a current is applied to the getter heating heater 32 so as to heat the getter material 30 up to about 400° C. At this time, the getter material 30 is activated to absorb nitrogen, oxygen, moisture and so on generated inside the groove after the anodic bonding.

Embodiment 3

Thus, the description of Embodiment 1 mwas made about an example where the whole of the bonded substrate 12 was heated to activate the getter material 30 after anodic bonding, and the description of Embodiment 2 was made about another example where a current was applied to the getter heating heater 32 to activate the getter material 30 after anodic bonding. However, those embodiments may be combined. That is, the whole of the bonded substrate 21 is heated to activate the getter material 30 after anodic bonding, while a current is applied to the getter heating heater 32 at a desired point of time so as to activate the getter material 30 again to thereby make the getter material 30 absorb gas, moisture and so on generated inside the recess portions 20 and 22.

Embodiment 4

Figure 6:
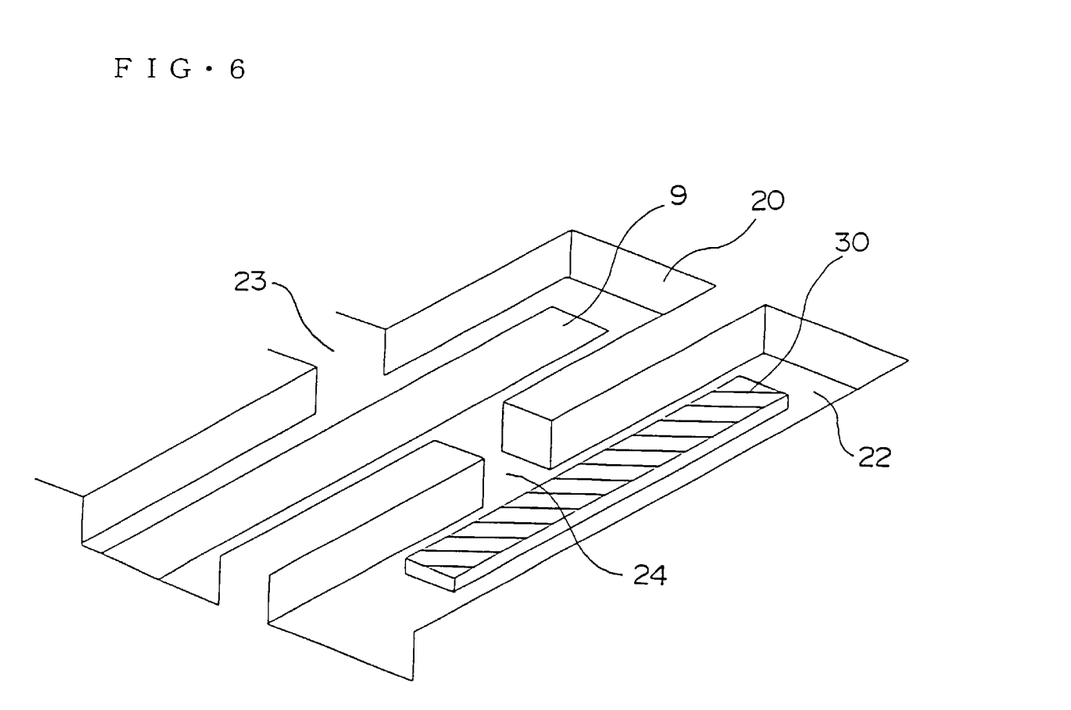
FIG. 6 is a perspective view illustrating the details of a third substrate of an ink jet head according to Embodiment 3 of the present invention.

The getter recess portions 22 are connected in their longitudinal direction correspondingly to the respective recess portions 20 in the above embodiments. However, these getter recess portions 22 may be provided on the opposite sides of the recess portions 20 which are disposed side by side as shown in FIG. 6. In that case, narrow grooves 23 connecting the recess portions 20 with each other and narrow grooves 24 connecting the recess portion 20 with the getter recess portion 22 are provided. Alternatively, a getter material 30 may be provided in each recess portion 20 (without providing it in a getter recess portion 22). In either case, any one of the methods according to Embodiments 1 to 3 is adopted for activation of the getter material 30.

Embodiment 5

Figure 7:
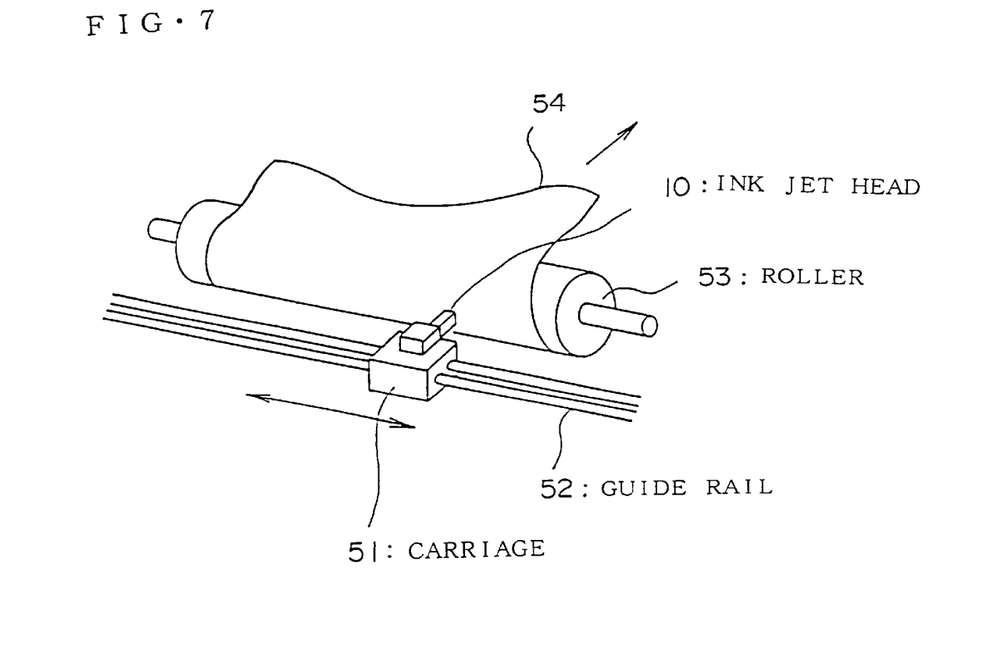
FIG. 7 is an explanatory diagram showing a mechanism in the circumference of the ink jet head according to the embodiment of the present invention of FIG. 1, FIG. 5 or FIG. 6.
Figure 8:
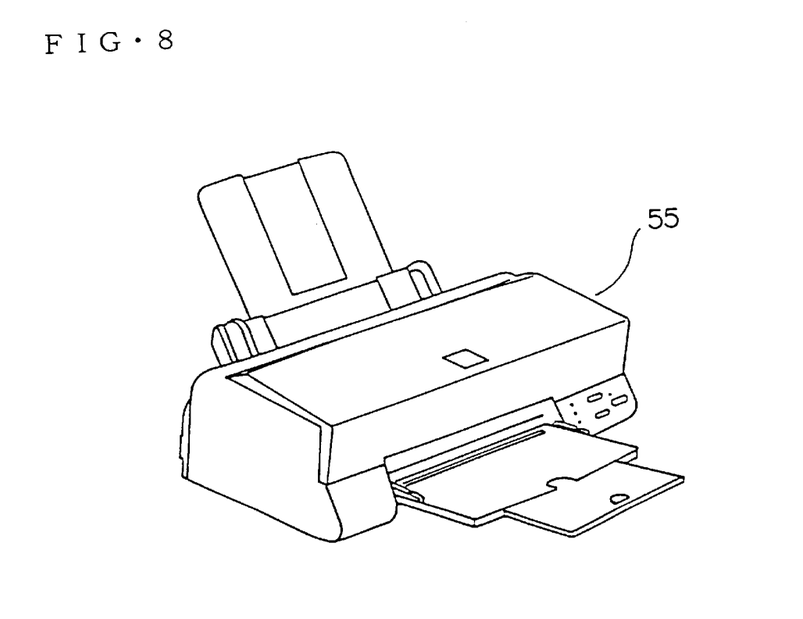
FIG. 8 is an outline view of an ink jet recording apparatus mounted with the mechanism in FIG. 7.

An ink jet head 10 according to any one of the above embodiments is attached to a carriage 51, as shown in FIG. 7. This carriage 51 is movably attached to a guide rail 52, and the position of the ink jet head 10 is controlled in the widthwise direction of paper 54 fed out by a roller 53. This mechanism of FIG. 7 is mounted on an ink jet recording apparatus 55 shown in FIG. 8.

Embodiment 6

Figure 9:
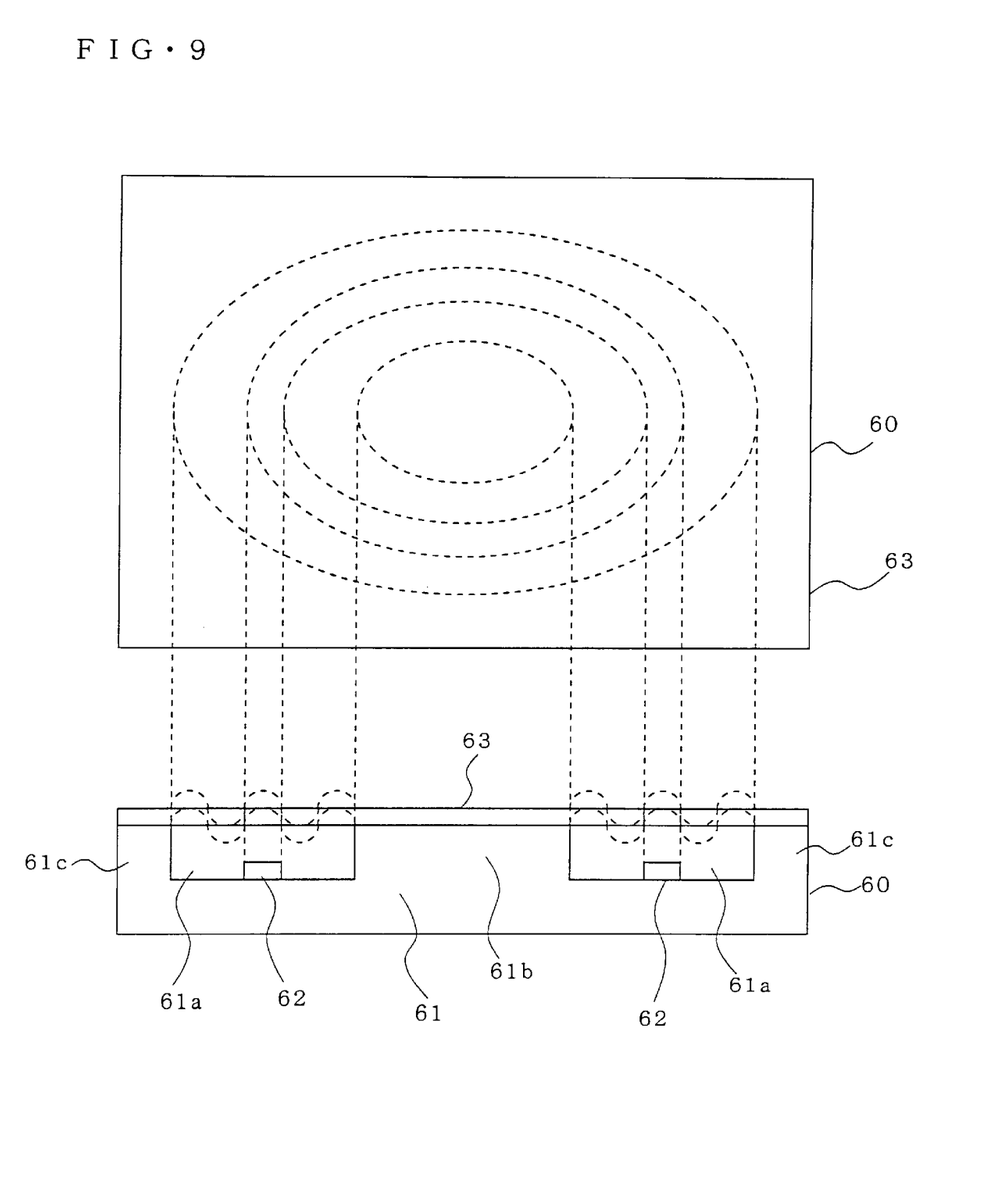
FIG. 9 is an explanatory diagram of a reflector type diffraction grating according to Embodiment 4 of the present invention.

In the above Embodiments 1 to 5, description was made about an inkjet head as an example using an electrostatic actuator. Next, description will be made about an example where an electrostatic actuator is used for a reflector type diffraction grating. As shown in FIG. 9, a reflector type diffraction grating 60 is constituted by a substrate 61 of glass, an electrode 62 attached to an ellipsoidal ring-like recess portion 61a formed in the substrate 61, and a thin film 63 of silicon provided to cover the substrate 61. This electrode 62 is provided for generating an electrostatic force between the thin film 63 and the substrate 61. Specifically, the electrode 62 is formed by vapor deposition of ITO or the like. In the substrate 61, an ellipsoidal portion 61b at the center and a circumferential portion 61c excluding the recess portion 61a are projecting with the same height, and in this portion the substrate 61 is anode-bonded with the thin film 63. Being formed of silicon, the thin film 63 is electrically conductive so as to act also as an electrode when an electrostatic force is made to act on the film 63. The thin film 63 may be formed of not-conductive material such as polymeric film with an electrode added separately thereto. In addition, a reflector film such as gold chrome, gold, titanium gold, or the like is laminated on the surface of the thin film 63 (on the opposite side to the surface facing the substrate 61, which will be referred to as "reflective surface") so as to reflect light incident to the thin film 63 at sufficient reflectivity.

Figure 10:
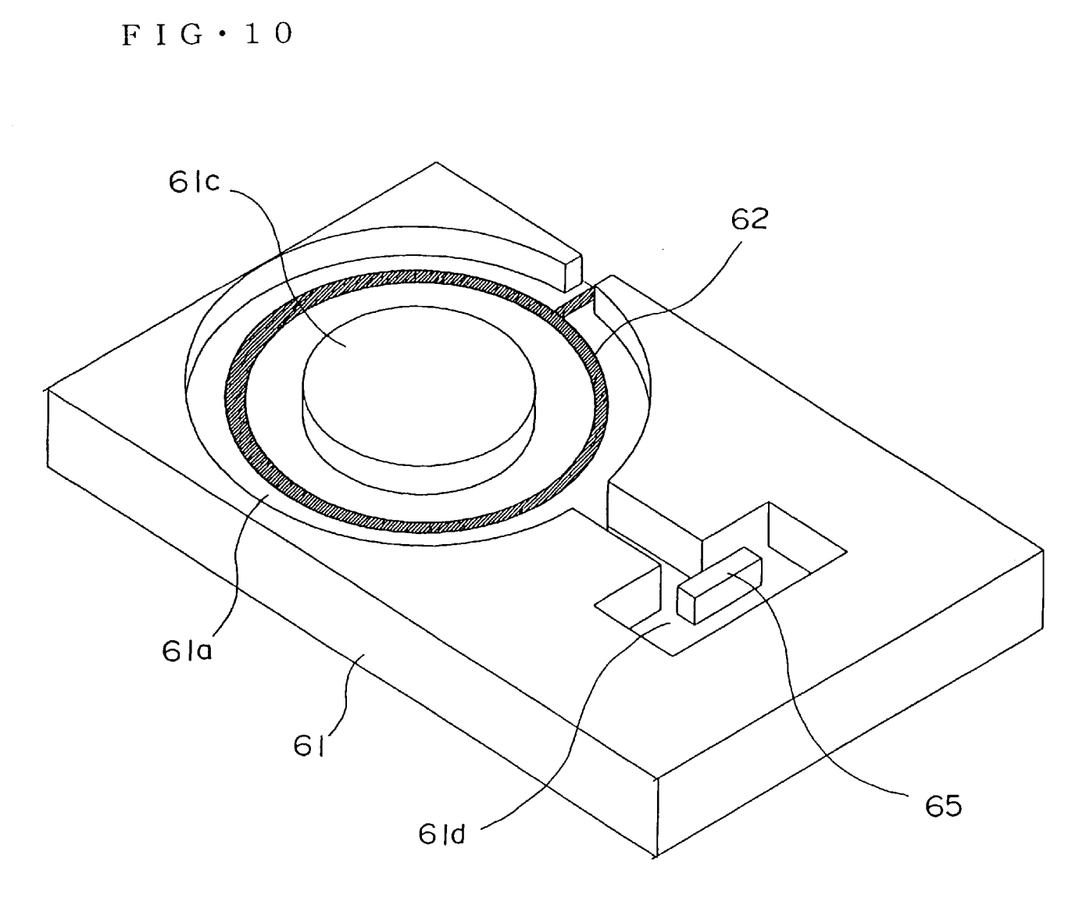
FIG. 10 is a perspective view illustrating the details of a glass substrate of the reflector type diffraction grating in FIG. 9.

A recess portion 61d communicating with the recess portion 61a is further provided in the substrate 61 of this reflector type diffraction grating 60, as shown in FIG. 10. A getter material 65 is disposed in this recess portion 61d. The getter material 65 is activated by any one of the method according to Embodiments 1 to 3, so as to absorb gas or moisture in the recess portion 61a. Consequently, the electrostatic force of the reflector type diffraction grating 60 does not change, so that the transformation of the thin film 63 is made stable.

Next, the operation of this reflector type diffraction grating 60 will be described. If the thin film 63 and the electrode 62 of the reflector type diffraction grating 60 are in the same potential, no electrostatic force is generated between the film 63 and the electrode 62, and the thin film 63 keeps its surface flat by its own tension. Therefore, light incident to the reflective surface is reflected as it is at the same angle as the incident angle. Next, an AC voltage is applied between the thin film 63 and the electrode 62. That is, periodically, the substrate 61 and the thin film 63 become equal in potential to each other and become different in potential from each other. Then, an attraction force is caused between the substrate 61 and the film 63 by electrostatic force corresponding to the generated potential difference. At the moment when there appears a potential difference between the substrate 61 and the film 63, the thin film 63 is elastically transformed in the sinking direction viewed from the reflective surface. On the other hand, at the moment when the substrate 61 and the film 63 are equal in potential to each other, the attraction force is released, and the thin film 63 is made to restore its flat state again by elasticity. Such a process is repeated so that vibrations are generated in the thin film 63.

Then, if the rigidity of the thin film 63 is high enough, the thin film 63 vibrates in a body as a whole completely synchronously with the frequency of the driving voltage. However, if the rigidity is not high enough, the thin film 63 cannot act in a body when the frequency of the driving voltage exceeds a predetermined value. As a result, a wave generated in the vicinity of the electrode 62 is propagated toward a fixed end. The wave is reflected on a border between the recess portion 61a and the projecting portion 61b or 61c, the border being the fixed end. Then, the reflected wave interferes with its original wave so that a standing wave is formed on the thin film 63. As a result, when light is incident to the film surface, the thin film 63 functions as a reflector type diffraction grating having characteristics depending on the wavelength of the standing wave and the wavelength of the incident light. For example, the film 63 has a function to diffract light in the direction of θ satisfying n λ/p=sin θ where p designates the pitch of the standing wave, λ designates the wavelength of the incident light, and n designates an integer. Then, the standing wave can be generated more efficiently if the width of the electrode 62 is made about ½ of the pitch p.

Figure 11:
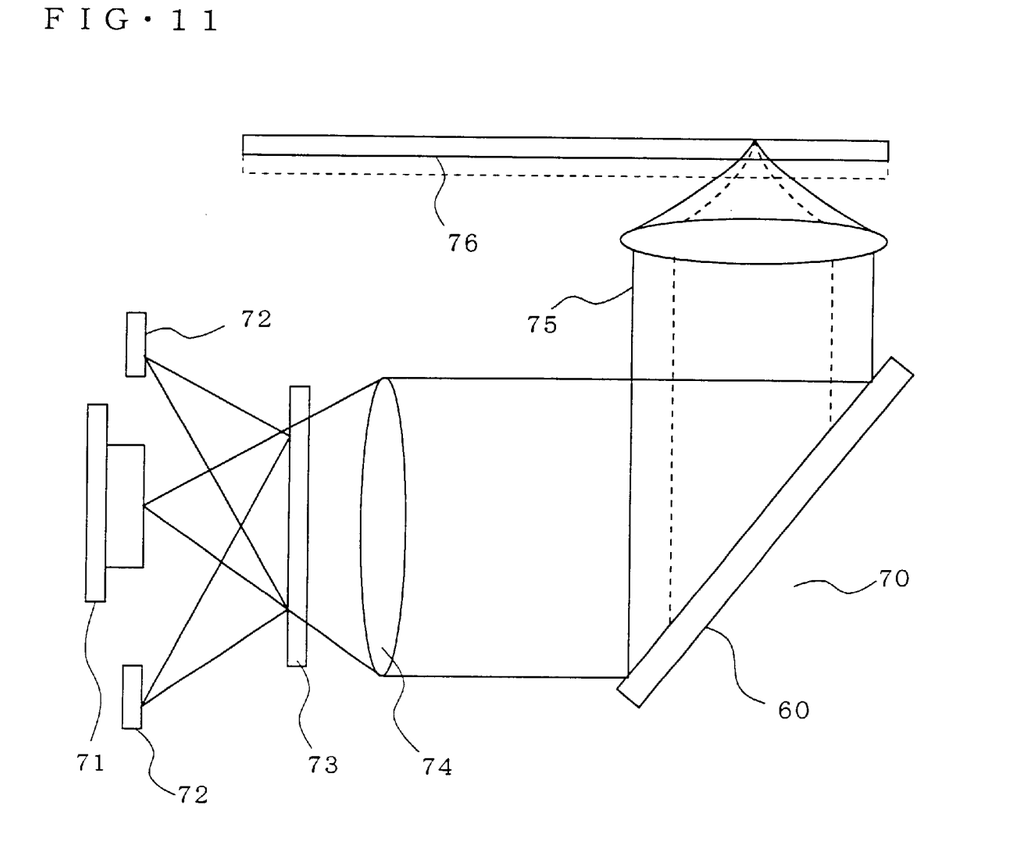
FIG. 11 is an explanatory diagram of an optical system of an optical head using the reflector type diffraction grating in FIG. 9.

Next, description will be made about an optical head provided with the above-mentioned reflector type diffraction grating 60. As shown in FIG. 11, the optical head 70 is constituted by a semiconductor laser 71, photodiodes 72, a hologram 73, a collimator lens 74, an objective lens 75 and the reflector type diffraction grating 60.

Next, the operation will be described. At the time of DVD playback, the film 63 and the electrode 62 of the reflector type diffraction grating 60 are set to be equal in potential to each other. Consequently, the thin film 63 is kept its surface flat by its own tension, so that the thin film 63 functions in the same manner as a conventional rising mirror. Laser light emitted from the semiconductor laser 71 passes through the hologram 73, and the laser light is converted into parallel light by the collimator lens 74. The direction of the light is changed by the reflector type diffraction grating 60, and the light is collected by the objective lens 75, so that a spot suitable for a DVD disk is formed on an optical disk 76. Light reflected on the optical disk 76 passes through the objective lens 75, and the direction of the light is changed by the reflector type diffraction grating 60. Then the light is collected on the photodiodes 72 by the collimator lens 74 and the hologram 73.

On the other hand, at the time of CD playback, an AC voltage is applied between the film 63 and the electrode 62 of the reflector type diffraction grating 60. Consequently, in the area of the recess portion 61a of the substrate 61, standing waves are formed in concentric ellipses. As a result, since the area of the projecting portion 61b at the center portion of the substrate 61 still remains flat, light is reflected thereon at an angle equal to the incident angle, while in the area transformed like a wave, light is defracted and scattered so that the light is not collected in a spot on the optical disk 76. That is, the reflector type diffraction grating 60 functions as a mirror with a limited numerical aperture. As a result, a spot suitable for CD playback is formed.

As described above, an optical head which can play DVD and CD desirably can be constituted only by ON/OFF of electric signals, for example, by applying an AC voltage to the reflector type diffraction grating 60. In addition, since the getter material 65 included in the reflector type diffraction grating 60 absorbs gas, moisture and so on inside the reflector type diffraction grating 60, the dielectric constant is kept constant, so that the operation of the reflector type diffraction grating 60 as an electrostatic actuator is also stabilized, and the operation of the optical head is also stabilized.

Embodiment 7

Figure 12:
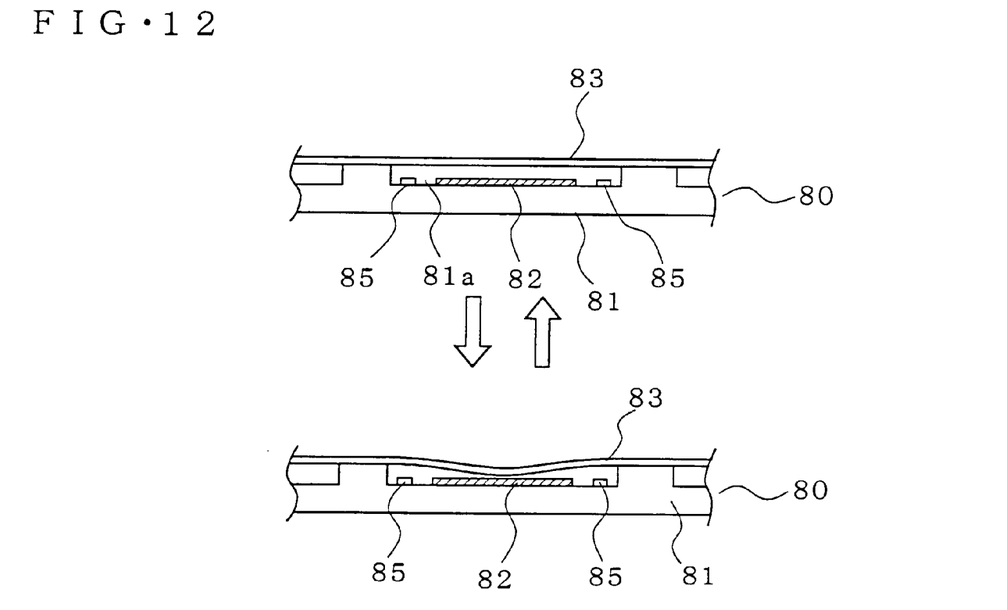
FIG. 12 is an explanatory diagram of a reflector type light valve according to Embodiment 5 of the present invention.
Figure 13:
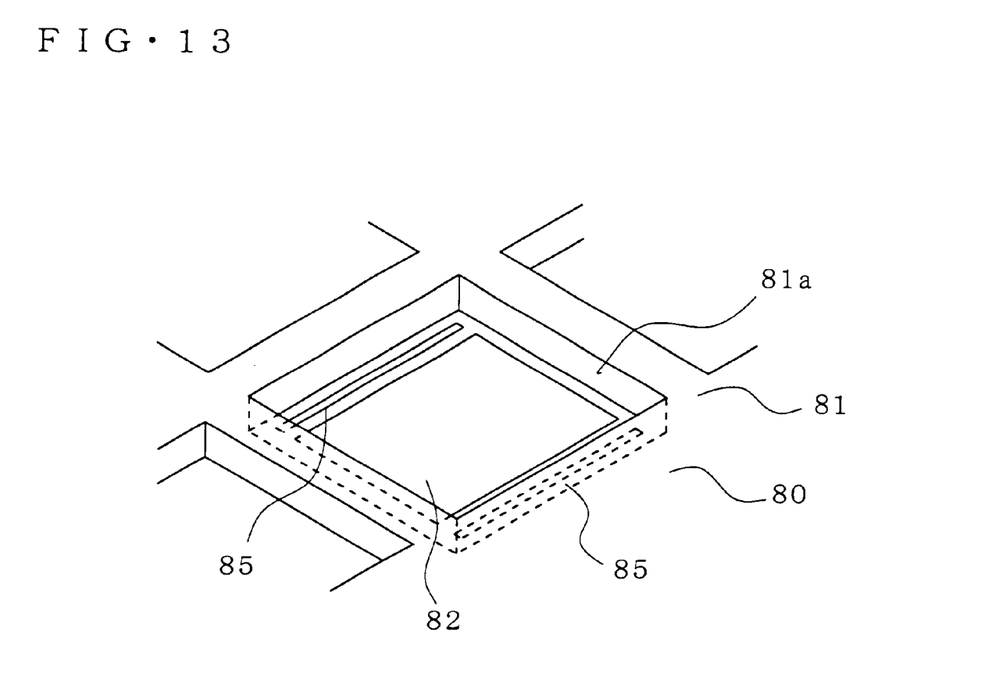
FIG. 13 is a perspective view showing the details and arrangement of a glass substrate of the reflector type light valve in FIG. 12.

Next, description will be made about a reflector type light valve (light modulation element) as another example using an electrostatic actuator. As shown in FIG. 12, a light modulation element 80 is constituted by a substrate 81 of glass, an electrode 82 attached to a quadrilateral recess portion 81a formed in the substrate 81 by etching or the like, and a thin silicon film 83 provided to cover the substrate 81. In addition, narrow getter materials 85 are disposed on opposite sides of the electrode 82 in the recess portion 81a respectively. These getter materials 85 are also activated by any one of the methods according to Embodiments 1 to 3. This electrode 82 is provided for generating an electrostatic force between the thin film 83 and the substrate 81. The thin film 83 is formed of silicon, so that it is electrically conductive and acts also as an electrode when an electrostatic force acts thereon. When no voltage is applied between this thin film 83 and the electrode 82, no electrostatic force acts on the thin film 83, so that the thin film 83 becomes a flat surface by its own tension. When a voltage is applied between the thin film 83 and the electrode 82, an electrostatic force acts on the thin film 83, so that the thin film 83 is bent as shown in FIG. 12 to scatter incident light. Such recess portions (window portion) 81a are disposed in two dimensions corresponding to pixels as shown in FIG. 13. The electrode 82 of each recess portion 81a and its corresponding portion of the thin film 83 will be thereafter referred to as mirror element.

Figure 14:
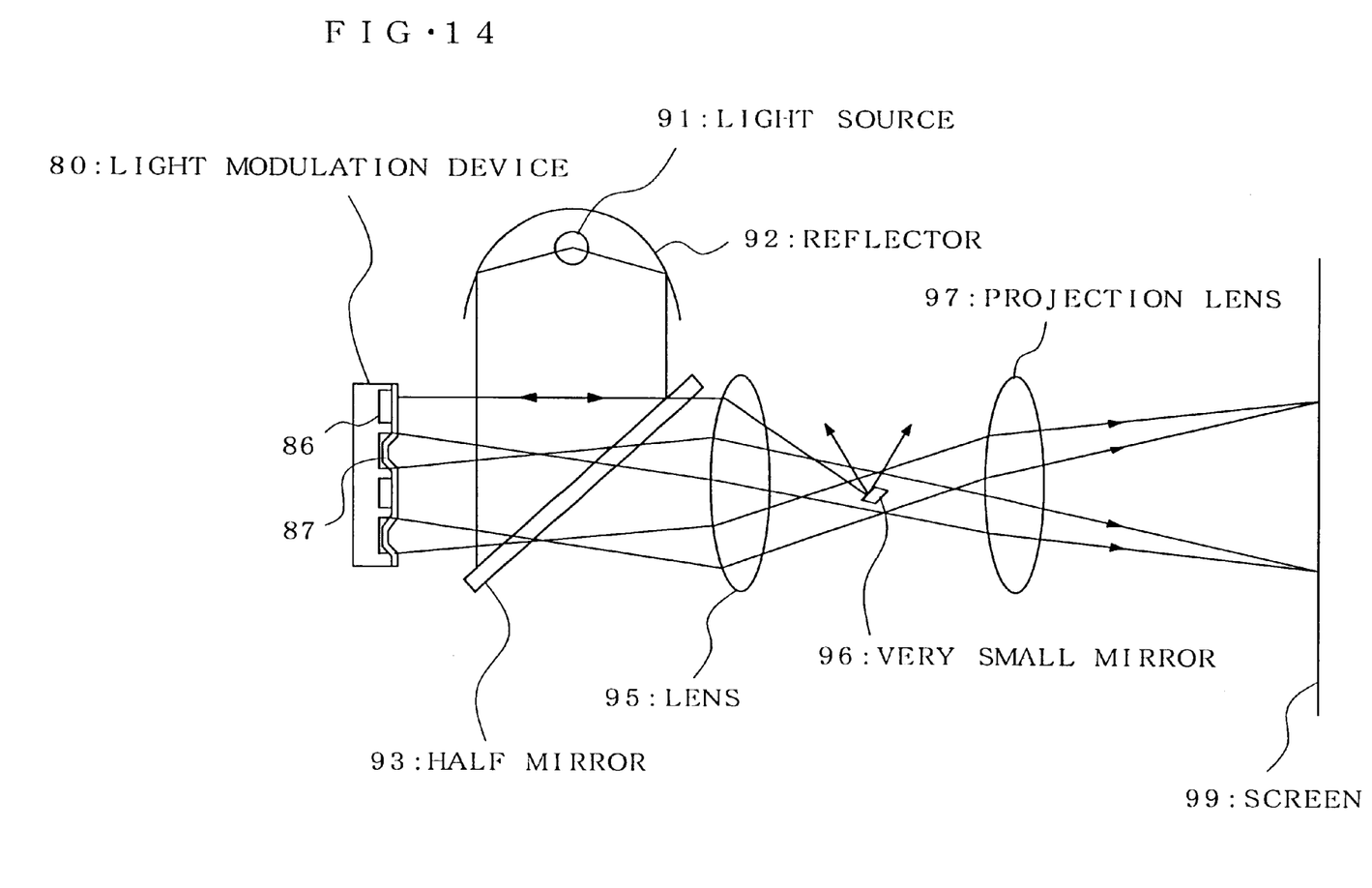
FIG. 14 is an explanatory diagram of an optical system of a projection type display unit using the reflector type light valve in FIG. 12.

Next, description will be made about a projection type display unit using this light modulation element 80. In this projector unit 90, light emitted from a light source 91 is reflected on a parabolic reflector 92, converted into substantially parallel light flux, deflected by a half mirror 93, and enters the above-mentioned light modulation element 80. In mirror element 86 to which a driving voltage is not applied, reflected light is parallel. Therefore the light is collected by a lens 95 through the half mirror 93, and the collected light enters a very small mirror 96. Since the reflective surface of the very small mirror 96 has a fixed angle with respect to an optical axis, the incident light is all scattered, and it does not reach a screen 99.

On the other hand, any mirror element 87 transformed by a driving voltage supplied thereto functions like a concave mirror, so that light reflected thereon passes through the lens 95, passes around the very small mirror 96, and forms an image on the screen 99 through a projection lens 97. That is, radiation light is modulated in accordance with picture signals supplied to the light modulation element 80, and display in accordance with the picture signals is made on the screen 99.

The light modulation element 80 operates thus, and functions as a reflector type light valve. Since the getter material 85 is activated to absorb gas, moisture and so on inside the recess portion 8 la, the electrostatic force when the light modulation element 80 is driven is also stabilized, and the operation of the reflector type light valve is also stabilized.

What is claimed is:

1. An electrostatic actuator comprising:
an insulating substrate provided with a recess portion, an electrode disposed in said recess portion formed in said insulating substrate, and a thin film provided so as to cover said recess portion of said insulating substrate, wherein said thin film is transformed by electrostatic force generated by application of a voltage between said electrode and said thin film, characterized in that a getter material is disposed in said recess portion or in another recess portion provided so as to communicate with said recess portion.

2. An electrostatic actuator according to claim 1, characterized in that said getter material consists of Ti or a Ti alloy.

3. An electrostatic actuator according to claim 1, characterized in that said getter material is heated so as to be activated after said insulating substrate and said thin film are bonded with each other in a manufacturing process.

4. An electrostatic actuator according to claim 1, characterized in that a heating mechanism for heating said getter material is provided on said insulating substrate having said recess portion.

5. An electrostatic actuator according to claim 4, characterized in that said getter material is heated by supplying a heating current to said heating mechanism.

6. An electrostatic actuator according to claim 4, characterized in that a portion of said insulating substrate where said heating mechanism is provided is cut off from the opposite side to a side where said heating mechanism is placed to thereby form a diaphragm.

7. An ink jet head characterized in that an electrostatic actuator according to claim 1 is incorporated in said ink jet head as a mean for providing a driving force for ejecting ink.

8. An ink jet recording apparatus characterized in that said ink jet recording apparatus is equipped with an ink jet head according to claim 7.

9. A reflector type diffraction grating characterized in that an electrostatic actuator according to claim 1 is incorporated into said diffraction grating as a driving means for light diffraction.

10. An optical head characterized in that said optical head is equipped with a reflector type diffraction grating according to claim 9.

11. In a reflector type light valve, the improvements wherein an electrostatic actuator according to claim 1 is incorporated into said reflector type light valve for providing a driving force for said reflector type light valve.

12. In a projection display unit, the improvement wherein the reflector type light valve according to claim 11 is mounted in said projection display unit.

13. An ink jet head comprising a plurality of nozzle holes, a plurality of independent ejecting chambers communicating with said nozzle holes respectively, diaphragms each of which consist of at least one wall of each of said ejecting chambers so that a part of the wall can be mechanically transformed, grooves provided in parallel with said diaphragms, driving means provided in said grooves for driving said diaphragms, and a common ink cavity for feeding ink to said plurality of ejecting chambers, wherein when a pulse voltage is applied to said driving means, said diaphragms corresponding to said driving means are transformed in a direction to increase pressure in said ejecting chambers to eject ink drops toward recording paper from said nozzle holes, characterized in that a getter material is disposed in said grooves or in recess portions communicating with said grooves.

14. A reflector type diffraction grating comprising an insulating substrate having an area of a protrusion portion and an area of a recess portion, an electrode provided in said recess portion, and a thin film provided so as to cover said insulating substrate, wherein a voltage is applied between said electrode and said thin film to generate an electrostatic force so as to transform said thin film wavily, characterized in that a getter material is disposed in said recess portion or another recess portion provided in communication with said first-mentioned recess portion.

15. In a reflector type light valve, the improvements comprising an insulating substrate having recess portions respectively arranged in two dimensions correspondingly to pixels, electrodes arranged in said recess portions of said insulating substrate respectively, and a thin film provided to cover said substrate, wherein, when a voltage is applied between an electrode in one recess portion and said thin film to generate an electrostatic force, the portion of said thin film corresponding to said one recess portion is transformed by the generated electrostatic force, characterized in that a getter material is disposed in each of said recess portions.

16. An ink jet head comprising a first substrate, a second substrate and a third substrate, said first substrate having a plurality of nozzle holes, said second substrate having a plurality of diaphragms each of which constitutes at least one wall of each of independent ejecting chambers communicating with said nozzle holes respectively and a common ink cavity for feeding ink to said plurality of ejecting chambers, said third substrate having grooves provided in parallel with said diaphragms, and driving mans provided in said grooves for driving said diaphragms, so that when a pulse voltage is applied to said driving means, said diaphragms corresponding to said driving means are transformed in a direction to increase pressure in said ejecting chambers to eject ink drops toward recording paper from said nozzle holes, wherein a getter material is disposed in said grooves of said third substrate or in recess portions communicating with said grooves.

* * * * *